Patented Oct. 20, 1936

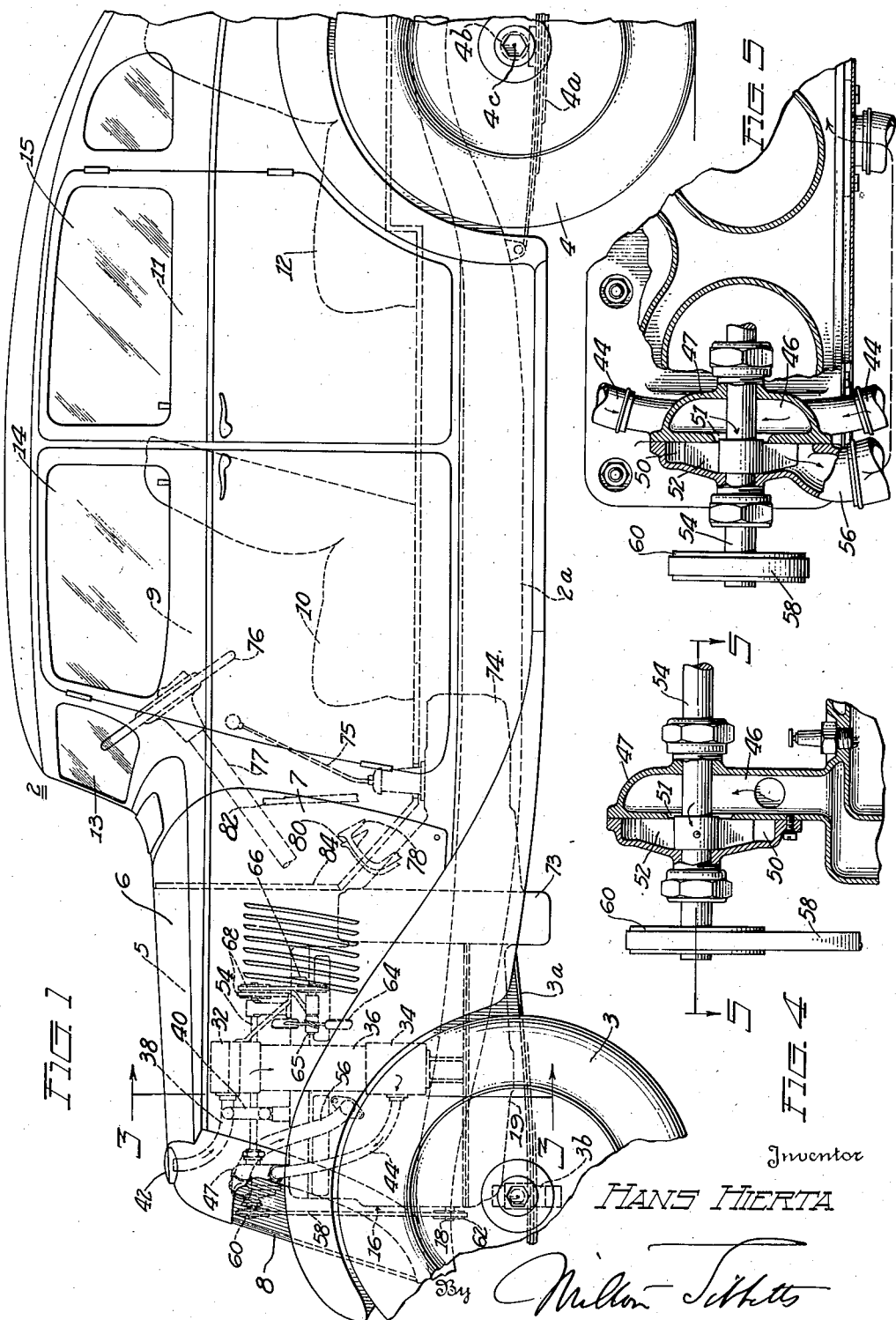

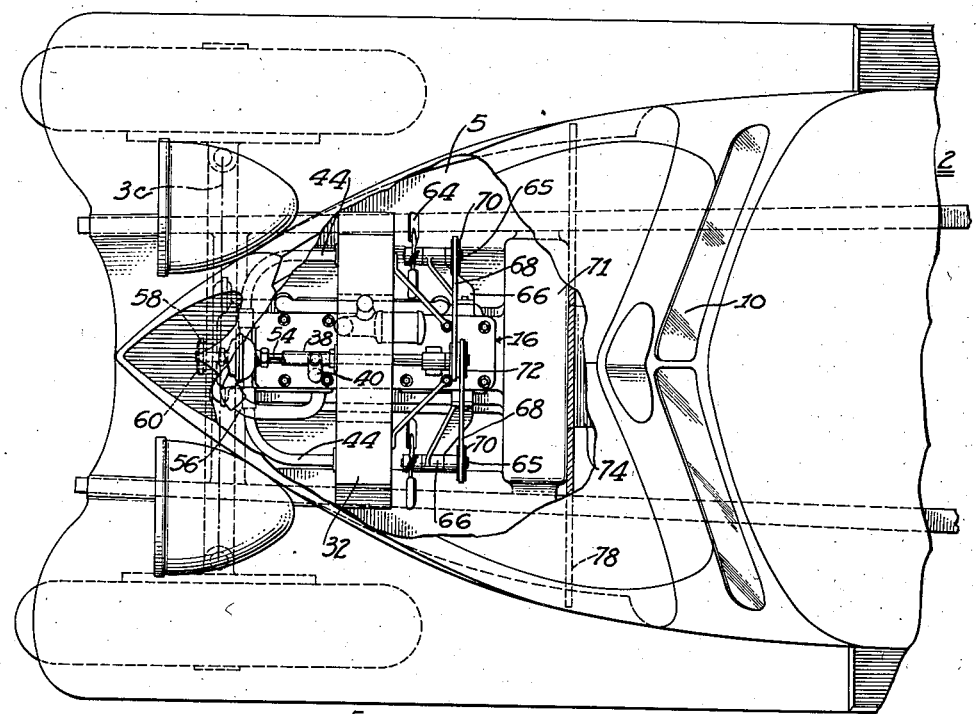
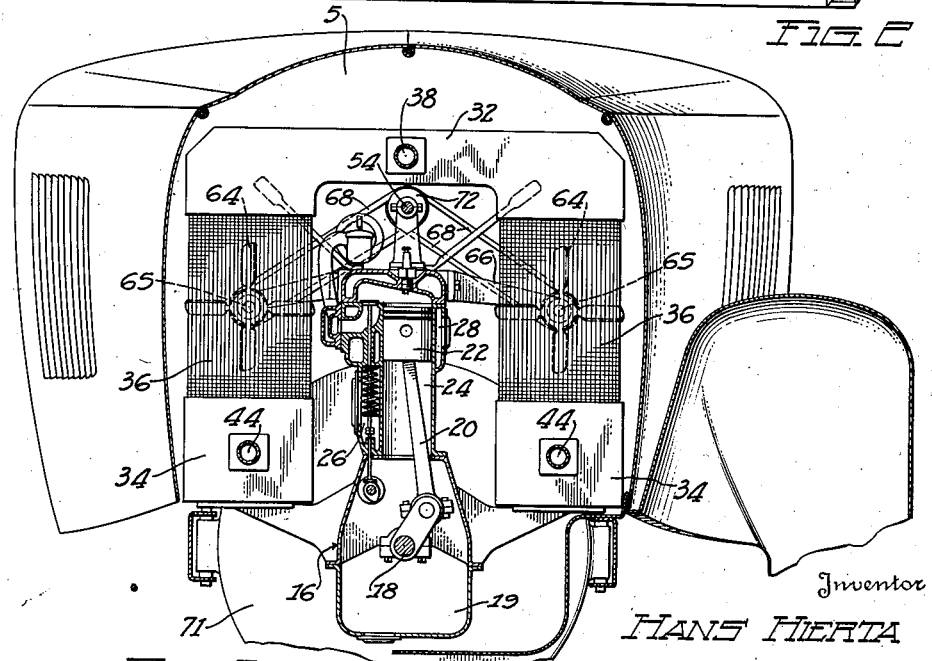

2,058,228

UNITED STATES PATENT OFFICE 2,058,228

MOTOR VEHICLE

Hans Hierta, Dearborn, Mich., assignor to Packard Motor Car Company, Detroit, Mich., a corporation of Michigan Application November 12, 1934, Serial No. 752,688

4 Claims. (Cl. 180—54)

This invention relates to motor vehicles. The invention relates more particularly to passenger vehicles of the type in which the engine is located in the forward portion of the vehicle and is cooled by means of a cooling fluid circulating through a jacket surrounding certain parts of the engine and through a radiator connected with the engine jacket.

In the following discussion the respective center lines of the front and rear wheels are referred to. The center line of the front wheels is to be understood as the line connecting the points in the respective axes of swinging movement of the wheel spindles at which the axes of rotation of the wheels respectively intersect said first axes. The center line of the rear wheels is, of course, the common axis of said wheels.

In passenger vehicles of the above type, the positions longitudinally of the vehicle of the seats with relation to the respective center lines of the front and rear wheels is determined by the position of the dash and this is determined by the position of the engine. The radiator is usually located at the forward end of the engine compartment and the engine and radiator are in tandem arrangement thereby positioning the engine at some distance from the forward end of said compartment. The position of the forward end of the engine compartment longitudinally of the vehicle has been determined by the development of motor vehicle design and is located above or slightly ahead of the center line of the front wheels.

The seats of a motor vehicle of the said type are usually located to the rear of the point midway between the center lines of the front and rear wheels. For example, in motor vehicles of the class having a single seat such as a roadster, the seat is placed back of the central point between the said center lines. In vehicles of the class having front and rear seats such as a touring car or sedan, the front seat is placed to the rear of the central point between the center lines of the wheels and the center of the rear seat is located above or to the rear of the rear axle. In general, the point longitudinally of a motor vehicle midway between the center lines of the wheels is the easiest riding point in the vehicle and the nearer to this point that the seats are located, the easier will be the riding qualities of the vehicle. It is therefore desirable to advance the seats of motor vehicles with relation to the said center lines in order to improve the riding qualities of such vehicles.

One object of the present invention is to produce a passenger motor vehicle of the above type in which, without changing the position of the forward end of the engine compartment and without sacrificing space in the seating compartments, the seats are located in advanced positions with relation to the center lines of the front and rear wheels as compared with prior constructions.

Another object of the invention is to produce a passenger vehicle in which the space occupied by the radiator and engine longitudinally of the vehicle is substantially reduced as compared with prior constructions.

Another object of the invention is to produce a passenger vehicle of the said type in which the portion of the body having the greatest transverse cross section is advanced longitudinally of the vehicle with relation to one or more predetermined points on the vehicle to secure a greater stream line effect.

With the above and other objects in view the invention consists in a construction embodying the novel and improved features hereafter described and particularly pointed out in the claims, the advantages of which will be readily understood by those skilled in the art.

The invention will be clearly understood from the accompanying drawings, illustrating the invention in its preferred form and the following detailed description of the constructions therein shown.

In the drawings, Fig. 1 is a view in side elevation, illustrating a motor vehicle embodying the invention;

Fig. 2 is a plan view, partially broken away, illustrating the forward portion of the vehicle;

Fig. 3 is a view in vertical section, taken substantially on the line 3—3 of Fig. 1;

Fig. 4 is a detail view in vertical section taken in a plane containing the axis of the pump shaft; and Fig. 5 is a sectional view, taken substantially on the line 5—5 of Fig. 4.

In its present form, the invention is embodied in a motor vehicle of the closed type, having a body indicated as a whole at 2, mounted on a frame 2a and supported by front and rear wheels 3 and 4 through the medium of springs 3a and 4a. The front and rear axles are indicated respectively at 3b and 4b and the center lines of the front and rear wheels at 3c and 4c. The vehicle is provided with a front engine compartment or chamber indicated at 5, formed by the usual casing. This casing comprises a bonnet having top sections 6, side sections 7 depending from the top sections and a grill 8 forming the forward wall of the casing and constituting a support for the forward end of the bonnet. The body is provided with a forward seating compartment 9 which contains a seat 10 for the driver and for one or more passengers and with a rear seating compartment 11 in which is a seat 12 for two or more passengers. The forward portion of the body is closed by a windshield 13 and the body is provided at the sides of the forward seating compartment with doors one of which is indicated at 14 and also with doors at the sides of the rear seating compartment one of which is indicated at 15.

Within the engine compartment 5 is mounted an internal combustion engine 16 of the usual type with the cylinders in line. As shown in Figs. 1 and 2 the front end of the engine is located adjacent to the grill 8 forming the forward wall of the engine compartment 5.

In the construction shown the forward wall of the engine is located slightly ahead of the center line of the front wheels. To enable the engine to be located in this advanced position the radiator is shifted from its usual position at the front end of the engine compartment and is placed between the forward and rear ends of said compartment by the side of the engine. As shown in the present application the radiator is located in a position intermediate between the forward and rear ends of the engine.

The engine comprises a crank shaft 18 rotating in a crank case 19 and connected by connecting rods, one of which is indicated at 20, with pistons, one of which is indicated at 22, reciprocating in cylinders, one of which is indicated at 24, valve mechanism indicated generally at 26 and a jacket 28 for the circulation of water or other suitable cooling fluid.

The radiator as above stated is mounted intermediate between the forward and rear ends of the engine and, in its illustrated form, embraces the engine as shown in Fig. 3, one section of the radiator being positioned on each side of the engine. The placing of the radiator by the side of the engine as compared with the usual tandem arrangement enables the length of the engine compartment to be reduced, the engine and radiator occupying a space longitudinally of said compartment no greater than the length of the engine.

The radiator comprises an upper chamber indicated at 32 and two lower chambers indicated at 34 each connected with the upper chamber by a core indicated at 36. The upper chamber of the radiator is connected by pipes 38 and 40 with that part of the engine jacket extending over the top of the engine. The pipe 38 is extended forwardly and upwardly to the upper part of the engine casing to form a filler tube which is closed by a cap 42. Each of the lower chambers 34 of the radiator is connected by a pipe 44 with a chamber 46 formed in a casing 47 secured to the top of the engine. This casing is also provided with a pump chamber 50 connected with the chamber 46 by an opening 51. Within the pump chamber operates a rotary pump 52 secured to a shaft 54 journalled in bearings carried respectively by the casing and by a bracket secured to the engine block. The chamber 50 is connected by a pipe 56 with the engine jacket. The water or other cooling fluid passes from the upper part of the engine jacket through the tubes 40 and 38 into the upper chamber 32 of the radiator and thence passes downwardly through the cores 36 into the chambers 34. From the chambers 34, the water passes through the pipes 44 into the chamber 46 of the casing 47 and thence through the opening 51 in said chamber into the pump chamber 50. From the pump chamber the fluid passes through the return pipe 56 into the engine jacket and thence circulates through the various passages in said jacket.

The pump shaft 54 is driven by means of a belt 58 passing about a pulley 60 secured to the forward end of said shaft and about a pulley 62 secured to the forward end of the crank shaft 18.

Air for circulation through the cores of the radiator sections enters the engine compartment at the forward end thereof through the grill 8. A fan is provided for drawing air through the core of each of the sections of the radiator respectively located at the sides of the engine, these fans being indicated at 64. Each fan is mounted upon the forward end of a shaft 65 journalled in a bearing in a bracket 66, secured to the engine block. Each fan shaft is driven by means of a belt 68 passing about a pulley 70 secured to the rear end of said shaft and about a pulley 72 secured to the rear end of the pump shaft 54. Each of these fans will draw air, which enters through the grill at the front of the engine through one of the radiator sections.

The shifting of the engine forwardly and the reduction in the space longitudinally of the vehicle occupied by the engine and radiator enables the dash and seating compartments to be shifted forwardly with relation to the center lines of the front and rear wheels a distance corresponding with the advance in the position of the engine. The moving forward of the engine also allows the clutch transmission and gear shift mechanism to be located in correspondingly advanced positions with relation to said center lines. As shown in the drawings the clutch and fly wheel casing are indicated at 73, the transmission casing at 74 and the gear shift lever at 75, all of which are located at substantial distances forwardly of the usual positions with relation to the center lines of the wheels. The controlling mechanisms for the vehicle comprise a steering wheel 76 mounted on the upper end of a steering post 77, clutch and brake pedals 78 and 80 and an emergency brake lever 82, all of which are located in advanced positions corresponding with the advanced position of the front seating compartment. The dash 84 has been advanced substantially the same distance as the engine. The front seat 10 and the rear seat 12 have been moved forward with relation to the center lines of the front and rear wheels without sacrificing space in the forward or in the rear seating compartment. By advancing the front seat, the said seat is placed in a substantially central location between the center lines of the front and rear wheels which is the easiest riding position longitudinally of the vehicle. The advance in the position of the rear seat locates the same a substantial distance ahead of the rear axle and nearer the central point between the center lines of the front and rear wheels and this greatly improves the "ride" in the rear seat. In the present construction that part of the body having the greatest cross section transverse to the longitudinal axis of the vehicle is advanced a substantial distance with relation to the forward end of the engine compartment and the rear end of the body, as compared with prior constructions the point at which the reduction in cross section at the rear begins having been moved forward by this distance. This increases the "stream line" effect.

The present invention is not limited to constructions in which the engine is located in the forward portion of the vehicle but certain features thereof may be embodied in constructions in which the engine is located at other points in the vehicle. The reduction in the space occupied by the engine and radiator in vehicles of the latter class will enable the position of the passenger carrying space, the seats and other parts to be varied with certain advantageous results.

It is to be understood that, in the present application, the terms "advanced", "forward", "advanced positions", and similar terms employed in the specification and claims, refer to the position of certain parts in any given vehicle embodying the present invention as compared with other vehicles having substantially the same length of wheel base.

It is also to be understood that the invention is not limited to the particular construction and arrangement of parts of the illustrated embodiment of the invention but that the invention may be embodied in other forms within the scope of the claims.

Having explained the nature and object of the invention and having specifically described a construction embodying the invention in its preferred form, what is claimed is:

1. A motor vehicle construction comprising a vehicle frame, an internal combustion engine supported on said frame, a radiator core on each side and intermediate the front and rear ends of the engine, a chamber extending over the engine and connecting said cores, a chamber at the base of each core, connections between said chambers and the engine, and a fan behind each of said cores at the sides of and driven by the engine.

2. A motor vehicle construction comprising an engine having a forwardly extending driven shaft, a pair of radiator cores located one beside each side of the engine, an upper chamber for the cores bridging the engine, a bottom chamber for each core, fluid connections between the engine and the chambers, a fan mounted at the rear of each core, a shaft for each fan, a shaft extending longitudinally above the engine and beneath the bridging portion of the upper chamber, a driving connection between the engine driven shaft and the longitudinally extending shaft, and driving connections between the longitudinally extending shaft and the fan shafts.

3. A motor vehicle comprising an engine, a pair of radiators located one beside each side of the engine, an upper chamber connecting the radiators and bridging the engine, a fluid connection between the chamber and the engine, a pump in advance of the engine, fluid connections between the pump and the radiators, a fluid connection between the engine and the pump, a fan mounted behind each radiator, an engine driven shaft extending longitudinally of and above the engine, and driving connections from said shaft to said pump and said fans.

4. A motor vehicle comprising an engine, an engine hood, a pair of lower radiator chambers extending longitudinally transversely of the vehicle intermediate the ends of the engine and one on each side of the engine, radiator cores extending upwardly from the chambers within the hood, an upper chamber connecting the cores and bridging the engine, said upper chamber also lying beneath the hood, a fluid connection between the upper chamber and the engine, a pump, a fluid connection between the engine and the pump, connections between the pump and the lower chambers, and means at the rear of the cores for moving air therethrough, said means lying on each side of the engine intermediate the ends thereof.

HANS HIERTA.